Feb. 25, 1958  R. E. HILL  2,824,721
CHOCOLATE CONDITIONING MACHINE
Filed Sept. 30, 1954  3 Sheets-Sheet 1

INVENTOR.
ROWLAND E. HILL
BY
Rowland V. Patrick

Feb. 25, 1958 R. E. HILL 2,824,721
CHOCOLATE CONDITIONING MACHINE
Filed Sept. 30, 1954 3 Sheets-Sheet 2 x chocolate
z water and steam

INVENTOR.
ROWLAND E. HILL
BY Rowland V. Patrick

Feb. 25, 1958  R. E. HILL  2,824,721
CHOCOLATE CONDITIONING MACHINE
Filed Sept. 30, 1954  3 Sheets-Sheet 3 x chocolate
z water and steam

INVENTOR.
ROWLAND E. HILL
BY
Rowland V. Patrick

United States Patent Office 2,824,721
Patented Feb. 25, 1958

2,824,721

CHOCOLATE CONDITIONING MACHINE

Rowland E. Hill, Stoneham, Mass., assignor to J. W. Greer Company, Wilmington, Mass., a corporation of Massachusetts Application September 30, 1954, Serial No. 459,229

1 Claim. (Cl. 257—86)

This invention relates generally to chocolate conditioning apparatus and more particularly to a machine for continuously processing chocolate and similar compounds.

Chocolate contains up to about 30 percent cocoa butter which, in turn, is composed of a complex mixture of chemical compounds of glycerin and higher molecular weight fatty acids including stearic, palmitic, and so forth. Its physical properties, such as melting points, crystallization rates, latent heats, and solidification points, depend primarily upon the nature and properties of the various fats. Cocoa butter being a complex mixture does not behave as a pure compound. It does not have a definite melting temperature nor a sharp solidification point. It crystallizes not as a complete mass but in successive steps, so that solid solutions may be formed or an unstable crystalline state may be produced under certain cooling conditions. Hence, it is necessary first to melt the chocolate and then to cool it under carefully controlled conditions in order to get it into an initial ideal state for use in a product. If the chocolate is overheated, for example above 130° F. for dark chocolate and 120° F. for milk chocolate, it tends to lose its flavor. If it is cooled too quickly, on the other hand, undesirable crystals are formed, resulting in a grainy chocolate.

It has definitely been proven that cocoa butter can and does exist in two states—one stable, and the other semi-stable. It usually solidifies first in the semi-stable state and enters slowly into the stable state. Chocolate possessing a hard "snap," good gloss and a long "shelf life" is in the stable state. Chocolate that is soft, grainy, dull, or has "bloom" and practically no shelf life, is in the unstable state. This latter state is usually caused by improper processing.

In the making of chocolate products, it is the usual practice to melt down solid bars of chocolate in large jacketed kettles provided with agitators to stir the chocolate. The chocolate is then cooled in separate kettles which require skillful supervision over extended periods of time, sometimes several hours. It is an object of this invention, therefore, to provide a chocolate processing machine for continuously processing any desired amount or types of chocolate, thereby greatly reducing the time, skill, and labor involved in processing the chocolate according to the usual above-described method.

It is another object of this invention to provide a chocolate processing machine of relatively small size, requiring only a small amount of floor space in comparison to that required by a number of kettles.

It is still another object of this invention to provide a machine for converting solid or liquid chocolate into liquid chocolate of substantially uniform consistency and desired temperature.

It is a further object of this invention to provide a machine for conditioning chocolate and the like which is adapted to handle quickly and easily various types of chocolate in succession with practically no intermediate cleaning and no waste.

While this invention primarily relates to a machine for processing chocolate in the solid state, it can also be applied to processing liquid or semi-liquid chocolate as may be returned from a moulding, coating, or depositing machine for example. Furthermore, materials whose properties are similar to chocolate, such as confectioners' coatings, may also be processed by the machine.

The novel features of this invention, together with further objects and advantages thereof, will become more readily apparent when considered in connection with the accompanying drawings, in which.

Figure 1:
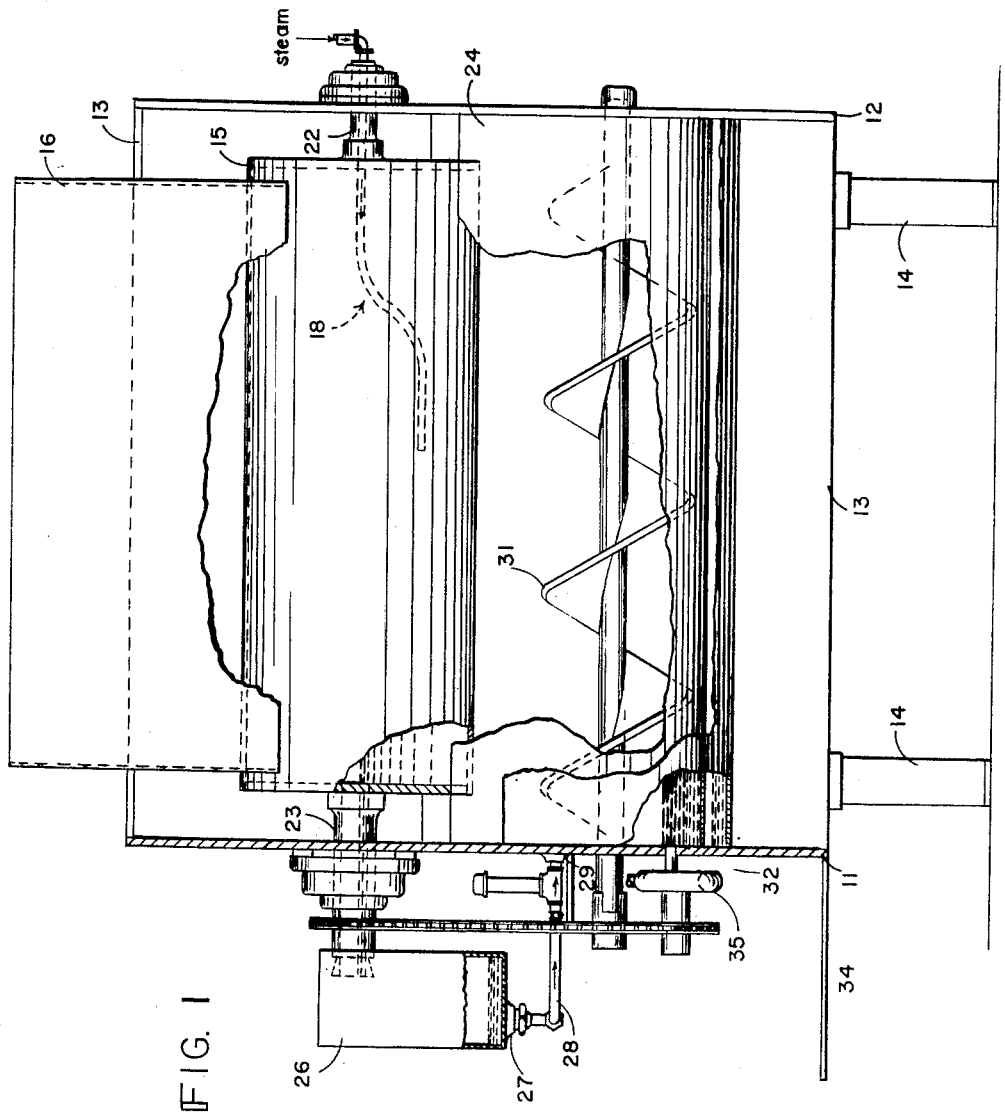
Fig. 1 is a front view in elevation of the machine according to this invention.
Figure 2:
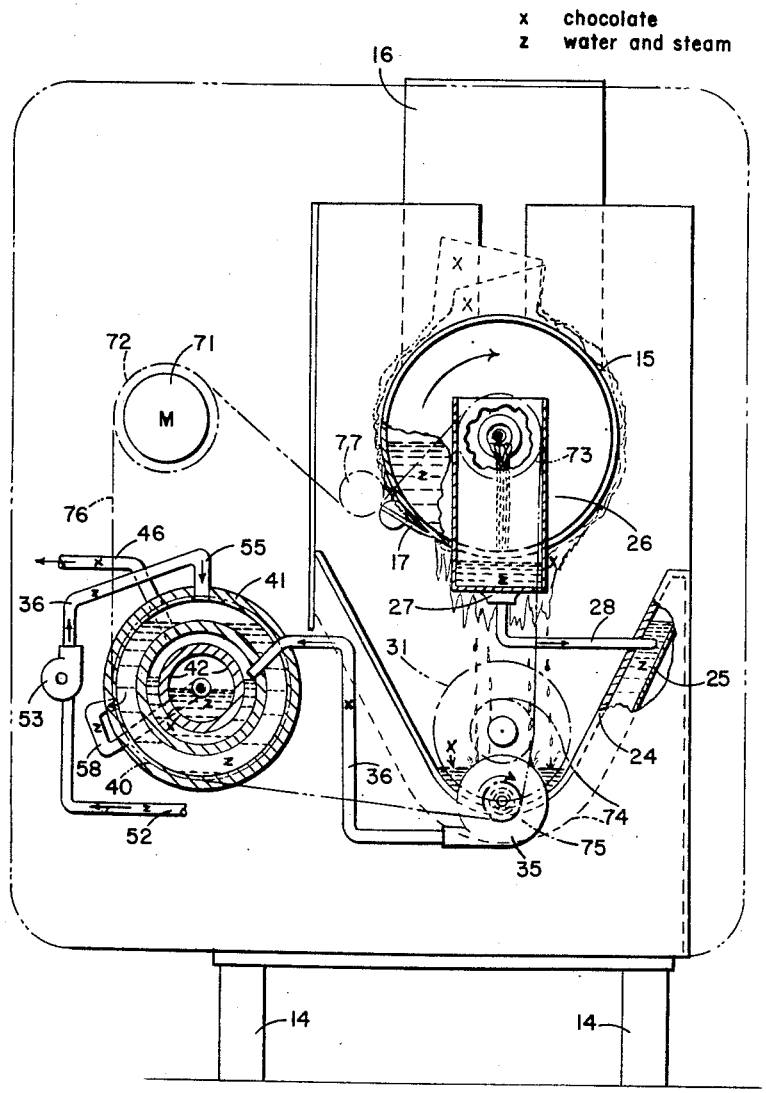
Fig. 2 is an end view in elevation of the machine according to this invention.

Referring now specifically to Figs. 1 and 2, it will be observed that the processing machine of this invention comprises a frame including a pair of upright members 11 and 12, and generally horizontal members 13 supported by legs 14. There is carried by the upper portion of the frame a hollow roll 15 mounted for rotation about a substantially horizontal axis by means of shafts 22 and 23. Positioned above roll 15 is a hopper 16 whose lower edges are contoured in such a way that they fit closely adjacent a portion of the surface of roll 15. A scraper 17 is affixed to the frame with its lower edge adjacent roll 15 as shown in Fig. 2.

Shaft 22 is hollow and one end of roll 15 is apertured in order that steam may be admitted to the interior of roll 15, thereby heating condensate in the roll and in turn heating the roll and melting chocolate coming in contact with the surface thereof. To this end, a steam pipe 18 extends through the hole in shaft 22 and is bent downwardly so that the end of pipe 18 projects into accumulated condensate. At the other end of roll 15 there is provided an outlet to discharge steam condensate when the condensate reaches the level of the outlet. Shaft 23, which is larger than shaft 22 and is also hollow, communicates with the interior of roll 15 through this outlet. Melted chocolate issuing from roll 15 is collected in a tank 24 positioned substantially beneath roll 15. A temperature controlled water jacket 25 surrounds tank 24 so as to keep the tank hot and thereby maintain the chocolate in a liquid state. It has been found desirable to utilize the condensate from roll 15 in jacket 25 and thereby conserve as much heat as possible. Hence, shaft 23, through which the steam condensate is discharged, terminates in a reservoir 26 having an outlet 27. A pipe 28 connects outlet 27 to an inlet 29 of the water jacket 25. Electrical heaters may also be provided in jacket 25 to insure that no solidifying of the liquid chocolate takes place.

Tank 24 includes a screw 31 of relatively large size rotatably mounted in tank 24 with its axis horizontal. Screw 31 serves to agitate the liquid chocolate and to convey it toward the left of tank 24 where an outlet 32 is provided. A pump 35 having its inlet port connected to outlet 32 forces liquid chocolate through a pipe 36. Pipe 36 is in turn connected to a heat exchanging device, illustrated in detail in Figs. 2 and 3.

Figure 3:
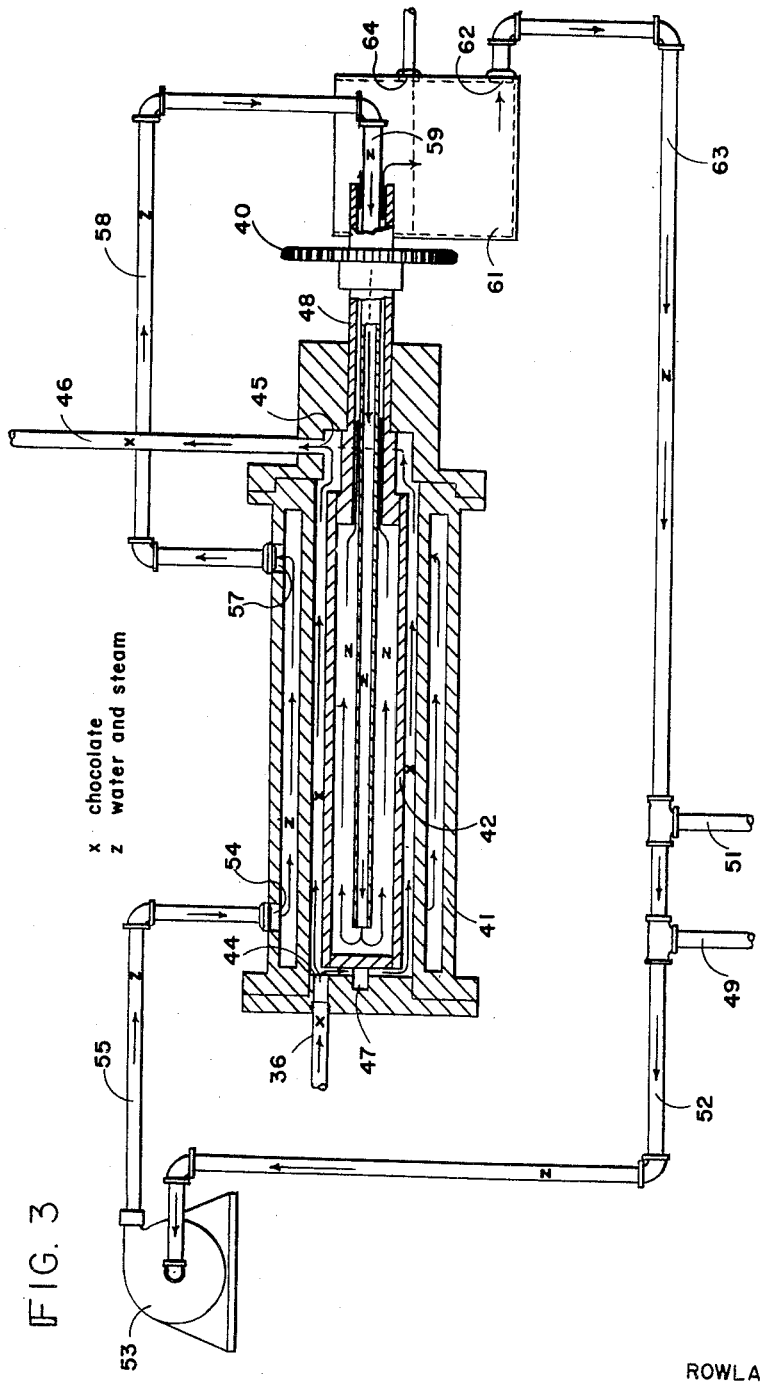
Fig. 3 is a view in cross-section and on an enlarged scale of the heat exchanging device utilized in the machine of this invention.

As shown in Figs. 2 and 3, the heat exchanging device comprises a hollow cylindrical member 41 coaxial with a somewhat smaller hollow cylindrical member 42. Accordingly, there is formed between the inner surface of cylindrical member 41 and the outer surface of cylindrical member 42 a relatively narrow annular passage, access to which is had through an inlet 44 formed in cylindrical member 41 and coupled to pipe 36. At the end of cylindrical member 41 remote from inlet 44 an outlet 45 is provided for connection with a discharge pipe 46. Cylindrical member 42 is mounted for rotation within cylindrical member 41 by means of shafts 47 and 48, the latter shaft being hollow. A sprocket 40, keyed to shaft 48, is utilized for driving member 42 as will appear more clearly from Fig. 3. In addition to providing for relative rotational motion between the cylindrical members, provision is also made for heating or cooling them as well. For this latter purpose, a cold water inlet 49 and a steam inlet 51 are coupled to a section of pipe 52 which in turn is connected to the inlet port of a pump 53. The outlet port of pump 53 and an inlet 54 in cylindrical member 41 are interconnected by a section of pipe 55. Inlet 54 leads to an annular passage formed in cylindrical member 41 between its inner and outer surfaces. An outlet 57 leads from this latter passage to pipe sections 58 and 59. Pipe section 59 extends through shaft 48 and into the interior of cylindrical member 42. The outer diameter of pipe section 59 is slightly less than the inner diameter of hollow shaft 48 so as to form an exit passage from cylindrical member 42. The exit passage formed in this way terminates in a reservoir 61 having an outlet 62. A section of pipe 63 is connected between outlet 62 and pipe 52 wherein the water and steam enters the system. It is seen, therefore, that the water in the system circulates continuously as is desirable from the standpoint of efficiency. As water or steam is added through inlets 49 or 51, a drain 64 near the top of reservoir 61 discharges the excess water from the system. Cold water inlet 49 and steam inlet 51 are preferably provided with modulating type valves responsive to a thermal element (not shown) for close control of the temperature of the water circulated in the system.

Fig. 2 best illustrates the manner in which the various rotatable parts of the machine are driven. As shown in Fig. 2, a motor 71 is mounted on the frame of the machine with its axis parallel to roll 15. Keyed to the shaft of motor 71 is a sprocket 72. Sprocket 72 is connected by a chain 76 to sprockets 73, 74 and 75 affixed to shaft 23 of roll 15, to the shaft of screw 31, and to the shaft of pump 35, in that order. Chain 76 also drives sprocket 40 associated with the heat exchanging device. To insure that proper tension exists on all of the sprockets, an idler sprocket 77 is positioned between drive sprocket 72 and roll sprocket 73, as shown. Driving motor 71 is preferably of the drip-proof type and is designed to run at relatively low speed such as 50 R. P. M. A separate motor, not shown, of small capacity, but having a much higher shaft speed, is used to drive pump 53 which circulates the water in the heat exchanging device.

In operation, solid or liquid chocolate placed in hopper 16 is rapidly melted or heated as the case may be upon coming in contact with the surface of roll 15. This is not only because roll 15 is heated internally, but also because scraper 17 keeps the surface of the roll substantially clear of melted chocolate as the roll rotates. Hence, the hot surface of the roll will be continuously exposed. The melted or liquid chocolate escapes from hopper 16 by way of the relatively narrow passage between the lower edges of the hopper and roll 15 whereupon it is collected in tank 24. The jacket 25, surrounding tank 24, keeps the tank hot, preventing the chocolate from solidifying or freezing. Also, screw 31 agitates the liquid chocolate in tank 24 to insure the consistency of the chocolate will be uniform. At the same time, the liquid chocolate is conveyed toward the left of Fig. 1 by screw 31 and is discharged from tank 24 through outlet 32. From outlet 32, the chocolate flows into pump 35. Pump 35 then forces the liquid chocolate through pipe 36 and into the heat exchanging device by way of inlet 44. The chocolate is caused to flow in a relatively thin layer through the annular passage provided in the heat exchanging device, between cylindrical members 41 and 42 and out discharge pipe 46. While flowing through the heat exchanging device, the temperature of the chocolate may be regulated as required to produce liquid chocolate of uniform desired viscosity and temperature in pipe 46. It is well known to those skilled in the art that close temperature control of the liquid chocolate prior to use is absolutely essential to prevent undesirable unstable crystallization of the chocolate. Accordingly, members 41 and 42 have been designed to conduct a maximum quantity of heat between the circulating water and the chocolate so that rapid changes in chocolate temperature may be achieved if necessary. To this end, the surface areas of members 41 and 42 exposed to the thin layer of chocolate are relatively large in comparison to their mass. By providing for continuous flow of cooling or heating water through the members, therefore, rapid changes in the temperature of the chocolate may be obtained. The rotation of the members 41, 42 with respect to one another and the small space between them insure every particle of chocolate being subjected to exactly the same treatment which results in a uniform chocolate temperature and prevents solid chocolate from forming in the event that cooling is required.

Although water has been found preferable as a heat exchanging medium, other mediums such as heat exchange oil might also be used. It is apparent that many other modifications of this nature within the spirit of the invention are also possible. Therefore, what is claimed is:

A machine for conditioning chocolate comprising a chocolate melting device, a collection chamber for the melted chocolate and a heat exchanger for conditioning the melted chocolate and maintaining the same in a fluid state at the required temperature, said melting device comprising a feed hopper for unmelted chocolate, a rotating drum having an inlet and an outlet for heat exchange medium, said feed hopper directing the unmelted chocolate to the periphery of said drum, said collection chamber comprising a heat exchanger tank provided with a jacket, said jacket having an inlet and an outlet for heat exchange medium to maintain the collected chocolate in a fluid condition, an outlet for the fluid chocolate, a conveyor agitator in said tank for transferring the fluid chocolate to said outlet, said heat exchanger comprising a pair of hollow cylindrical members having smooth cylindrical surfaces spaced concentrically with respect to one another and defining an annular passage therebetween, the outer cylinder being provided with a spaced wall defining a second annular passage, a conduit for passing fluid chocolate from said collection chamber to said first annular passage of said heat exchanger, pump means in said conduit for transferring fluid chocolate from said collection chamber through said first annular passage, means for rotating one of said heat exchange members with respect to the other to expose the chocolate uniformly to said surfaces as it flows through said first annular passage, means for passing heat exchange medium serially into said chocolate melting drum and into said jacket of said heat exchanger tank, a reservoir for another heat exchange medium, conduit means for transferring said other heat exchange medium from said reservoir interiorly of said inner hollow cylindrical member and said second annular passage to maintain said surfaces at a controlled temperature and thereafter back to said reservoir.

References Cited in the file of this patent

UNITED STATES PATENTS

| | | |
|---|---|---|
| 1,898,829 | Greer | Feb. 21, 1933 |
| 1,949,374 | Johnson | Feb. 27, 1934 |
| 2,143,256 | Andrews | Jan. 10, 1939 |
| 2,313,705 | Jack | Mar. 9, 1943 |